United States Patent [19]

Newman et al.

[11] Patent Number: 4,849,256

[45] Date of Patent: Jul. 18, 1989

[54] PROCESS FOR PLASTICIZING POLYVINYL ALCOHOL RESIN

[75] Inventors: Garry F. Newman, Tracy; Dean F. Carson, Pleasanton; Steve B. Cherry, Oakland, all of Calif.

[73] Assignee: The Clorox Company, Oakland, Calif.

[21] Appl. No.: 166,863

[22] Filed: Mar. 11, 1988

[51] Int. Cl.[4] .............................................. B05D 1/36
[52] U.S. Cl. .................... 427/202; 427/214; 427/222; 427/393.5; 427/421; 524/557; 525/61; 428/327
[58] Field of Search ............ 427/202, 214, 222, 393.5, 427/421; 524/557; 525/61; 428/327

[56] References Cited

U.S. PATENT DOCUMENTS

| 2,864,784 | 12/1958 | Marks | 260/29.6 |
| 3,121,701 | 2/1964 | Ingleby | 260/33.4 |
| 3,365,413 | 1/1968 | Monaghan et al. | 260/33.2 |
| 3,425,979 | 2/1969 | Monaghan et al. | 260/33.2 |
| 3,607,812 | 9/1971 | Takigawa et al. | 260/29.6 B |
| 3,882,196 | 5/1975 | Hanke | 260/895 |
| 3,985,702 | 10/1976 | Himes | 260/33.6 AQ |
| 3,991,225 | 11/1976 | Blouin | 427/214 |
| 3,997,489 | 12/1976 | Coker | 260/28.5 R |
| 4,060,510 | 11/1977 | Himes | 260/33.6 AQ |
| 4,119,604 | 10/1978 | Wysong | 260/33.2 R |
| 4,155,971 | 5/1979 | Wysong | 260/204 |
| 4,156,047 | 5/1979 | Wysong | 428/220 |
| 4,171,428 | 10/1979 | Kuhn | 521/72 |
| 4,242,384 | 12/1980 | Andrew | 427/421 |
| 4,323,492 | 4/1982 | Zimmerman et al. | 524/388 |
| 4,608,187 | 8/1986 | Chang | 252/90 |

FOREIGN PATENT DOCUMENTS

| 0157612 | 10/1985 | European Pat. Off. | |
| 96569 | 8/1960 | Norway | 427/202 |
| 1410744 | 10/1975 | United Kingdom | |

Primary Examiner—Shrive P. Beck
Assistant Examiner—Vi D. Dang

[57] ABSTRACT

An improved method for the production of a plasticizer-containing dry flowable polyvinyl alcohol (PVA) resin blend capable of thermoplastic processing. The method provides for the incorporation of plasticizers in intimate contact with the PVA resin without heating, cooling, or extended drying steps. Specifically, PVA resin granules having an appropriately small particle size distribution are spray-coated with a liquid plasticizer medium, and then mixed with a dry, fine powder coating medium to produce a flowable, dry plasticized PVA blend. Additional components, such as antioxidants, dyes, and antiblocking agents, may also be incorporated into the finished product.

21 Claims, 1 Drawing Sheet

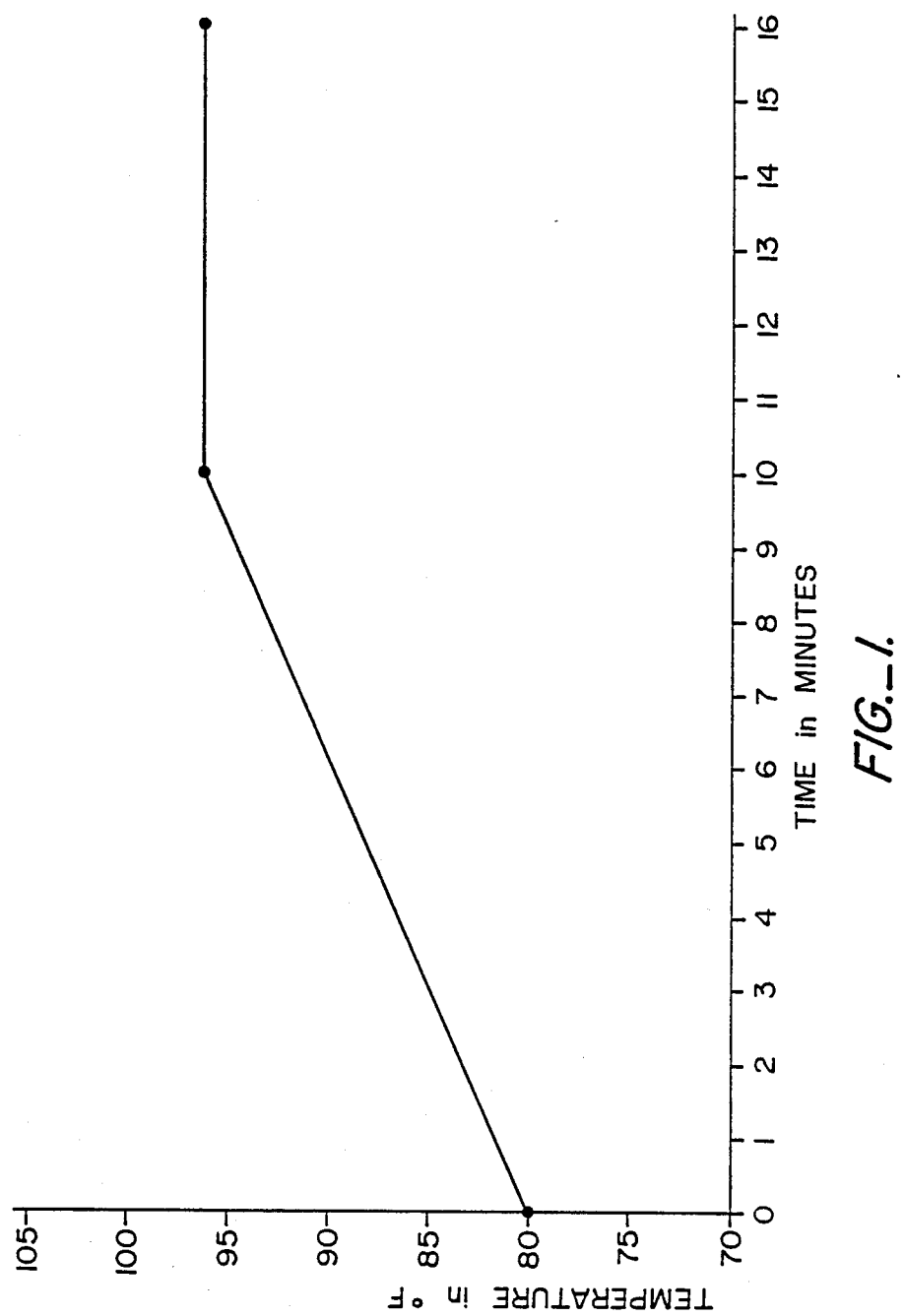

PROCESS FOR PLASTICIZING POLYVINYL ALCOHOL RESIN

BACKGROUND OF THE INVENTION

Polyvinyl alcohol (PVA) decomposes at 200° C., well below the temperatures required for thermoplastic processing. In order to process PVA thermoplastically, it is necessary to incorporate plasticizers into the PVA resin to be processed. Plasticizers act to lower the softening temperature of PVA below the decomposition point.

Incorporation of plasticizer into the PVA resin has proven to be a challenge. The plasticizer must be in intimate contact with the PVA resin to assure a homogeneous melt upon processing. Granules of PVA which have been insufficiently permeated by plasticizer using known methods yield incompletely plasticized regions after thermoplastic processing. The art has addressed this difficulty by providing various means to absorb the plasticizer into the PVA resin. For example, plasticizer has been incorporated into PVA resin by the use of a liquid carrier which must be subsequently removed, requiring processing and drying steps. An alternate process requires heating and cooling of PVA resin in the presence of plasticizer. The resin particles absorb the plasticizer, swell, agglomerate, and are then mechanically separated prior to thermoplastic processing. Other processes require the presence of numerous solvents, substantial energy inputs, or long reaction times for the plasticization. Generally, currently known processes are intricate and/or require careful control of temperature in order to produce a homogeneous mixture of PVA and plasticizer.

BRIEF DESCRIPTION OF THE INVENTION

The present invention relates to the addition of plasticizer to polyvinyl alcohol (PVA) to provide a dry, granular compound which is capable of thermoplastic processing, e.g., it is extrudable.

It has been surprisingly found that when PVA particles of a sufficiently small size distribution are plasticized, it is not necessary that the plasticizer be absorbed into the PVA particle to provide a homogeneous mix of PVA and plasticizer for thermoplastic processing. Rather, it is thought that the plasticizer is adsorbed onto the surface of the PVA particle, with only trace amounts of plasticizer absorption. It is also believed that the intimate contact of the plasticizer and the PVA resin which is afforded by the large surface to volume ratio of the particle allows the production of PVA/plasticizer granules which provide a homogeneous thermoplastic melt. To complete the process, a dry powder coating medium is employed for coating the PVA/plasticizer granules and producing a dry, flowable PVA/plasticizer blend. The process may be conducted within an ambient temperature range.

In a preferred embodiment, an antioxidant is mixed with the PVA resin particles prior to contact with a plasticizer, providing improved characteristics during thermoplastic processing of the PVA/plasticizer blend, e.g., reduced oxidation of the PVA. It is also preferred that the dry coating medium comprise one or more antiblocking agents which also act to provide enhanced properties (e.g., reduced blocking) to sheet or film products made from the PVA/plasticizer blend.

It is an object of the present invention to provide a dry, flowable mixture of plasticized PVA for use in thermoplastic processing and from which high quality films may be extruded.

It is still another object of the invention to provide a process for plasticizing PVA particles which does not require heating or cooling steps.

It is another object of the present invention to provide plasticized PVA granules which yield improved melt uniformity upon thermoplastic processing.

It is another object of the present invention to provide a process for plasticizing PVA particles which does not require long processing times.

It is yet another object of the present invention to provide a plasticized PVA blend which may be thermoplastically processed.

BRIEF DESCRIPTION OF THE DRAWINGS

FIG. 1 is a graph of blend temperature v. process time (in minutes) for the process of the present invention.

DETAILED DESCRIPTION OF THE INVENTION

In accordance with the present invention, appropriately sized PVA particles are agitated and coated with a liquid plasticizer medium. The PVA/plasticizer granules are then mixed with a dry coating to produce a dry, flowable PVA/plasticizer blend. Other additives, as appropriate, may be incorporated into the dry PVA/plasticizer blend.

Polyvinyl alcohol (PVA) resin is widely used as a film-forming material, and has good strength and water solubility characteristics. PVA is made by polymerizing vinyl acetate and subsequently hydrolyzing the resin, and PVA can and typically does include up to about 20 mole percent residual acetates, and may be considered a copolymer of vinyl alcohol and vinyl acetate. Other comonomers can be polymerized with the vinyl acetate, and are within the scope of the present invention. The term "polyvinyl alcohol" thus includes such copolymers. Examples of other comonomers include those having carboxylic acid or ester functional groups, such as acrylic acids, methacrylic acids, acrylates, methacrylates and maleates, and sulfonates. Such PVA copolymers are all included within the scope of the process of the invention herein.

The use of appropriately sized PVA particles is critical to achieving the proper association of PVA and plasticizer necessary for successful thermoplastic processing of PVA. PVA resins include particles of varying diameters. The range of particle sizes, or particle size distribution, of a particular resin is critical to the practice of the subject invention.

Resins which are appropriate for use in the subject invention will have a distribution of particle sizes, prior to adsorption of plasticizer, which provides a passage of at least 80% of the particles through a 35 mesh screen. This specification is satisfied by PVA resins comprised of granules of which at least 80 weight percent are less than about 500 microns (0.5mm) in diameter. Preferably, the PVA particle size distribution provides a passage of at least 80% through a 35 mesh screen, at least 25% through a 60 mesh screen, and at least 15% through a 100 mesh screen. More preferably, the PVA resin will be sized such that at least 95% pass through a 35 mesh screen. PVA resins which meet this more preferred specification will have particles in which at least 95 weight percent are less than about 500 microns in diameter. Most preferably, the PVA resin particles should have a particle size distribution such that at least 95% pass through a 35 mesh screen, at least 65% through a 60 mesh screen, and at least 25% through a 100 mesh screen. As used herein, all screen sizes are standard U.S. mesh.

A PVA resin having a particle size distribution such that less than 80% of the granules pass through a 35 mesh screen will result in a wet and sticky blend which may not be fully plasticized, is not free-flowing and which is difficult to extrude.

PVA resin having an appropriate particle size distribution is commercially available and exemplified by the products sold under the trademarks: POVAL (Kuraray), VINOL 205S (Air Products and Chemicals), GOHSENOL (Nippon-Gohsei), and GELVATOL 3000 (Monsanto). Other commercially available PVA resins can be mechanically conditioned, e.g., by milling, screening or pulverizing, to result in the appropriate size distribution. Air Products and Chemicals' PVA resins sold under the trademark VINOL 205 can be milled or pulverized to yield the requisite particle size distribution.

Other characteristics of the PVA resin, e.g., molecular weight and percent hydrolysis are determined by the end use of the resin and do not significantly affect the practice of the present invention.

Generally, the PVA resin particles, together with appropriate additives, are coated with a liquid plasticizer medium. Plasticizers act to reduce the softening point of PVA to below the decomposition point, and are added to PVA to facilitate thermoplastic processing. The plasticizer may be a single compound, or a mixture of compounds. Appropriate plasticizers are known to the art, and include but are not limited to, glycerin, trimethylolpropane (TMP), water, neopentyl glycol, polyethylene glycol, and mixtures thereof. Particularly preferred is a mixture of water, glycerol and TMP. Plasticizers which are liquids at ambient temperatures are especially appropriate for use with the subject process. Plasticizers which are solid or crystalline at ambient temperatures, such as trimethylolpropane, may be dissolved in water or another liquid plasticizer medium for use as a sprayable plasticizer. The plasticizer medium may be heated as necessary to incorporate non-liquid components; however, the plasticizer medium is preferably allowed to return to ambient temperatures to avoid heating of PVA granules during the process.

To achieve a uniform plasticizer coating it is preferred to utilize a spray mechanism to coat the PVA resin. The spray pattern must be appropriate for the PVA batch size, and for the spray nozzle and mixing apparatus used. A poor spray pattern may result in poor coating, incomplete plasticization of the PVA resin, and ultimately, an inferior product after thermoplastic processing. Spray patterns will be individual to the apparatus used, however, some generalities may apply. In general, a less viscous spray will coat better and cause less clogging of the nozzle. Nozzles providing a fine spray are preferred as they will generally coat more evenly than those with a coarse spray. Nozzles should be arranged so that a maximum area is covered. An example of a preferred spray nozzle is that manufactured by Spraying Systems Company, Wheaton, Ill., and sold under the trademark VEEJET, especially a VEEJET Model 31655 atomizing nozzle. The pressure used to spray the plasticizer through this particular nozzle is about 30 psig. The nozzle may be employed in a single, or more commonly, a ganged, configuration. The PVA granules may be mixed, agitated, or fluidized during coating to assure a uniform plasticizer layer. If used, mixing should provide maximal exposure of the granules with a minimum of heat generated. Thus, low and medium-intensity mixers, such as those utilized in the art for plastic processing, are preferred if mixing is used.

PVA granules should not be heated during the plasticizer coating process, as they may agglomerate and prevent adequate coating. Excessive shear forces result in excessive heat, which can increase the gross temperature of the PVA granules or cause degradation of the granules due to increased localized temperatures. Generally, the temperature should be maintained at less than 105° F., preferably less than 90° F., and mixing should be limited to that conducted in the low or medium-intensity mixers. The specific configuration of the mixer used is not critical, as long as sufficient mixing is achieved to effect even, homogeneous coating without production of excess heat. Alternatively, a fluid bed or electrostatic coating process may be employed.

The quantity of plasticizer which is present in the dry, plasticized PVA blend will be that amount which is sufficient to plasticizer the PVA granules. The specific amount of plasticize will generally vary from about 10 to about 20 weight percent, preferably from about 12 to about 18 weight percent, and more preferably from about 15 to about 17 weight percent.

The length of time required for coating of the PVA resin granules with plasticizer will vary depending upon equipment used, materials, and batch size, but in general will take from about 30 seconds to about 45 minutes, more usually from about 1 to about 15 minutes.

The PVA/plasticizer granules are next coated with a dry, fine powder coating, preferably an impalpable powder coating, producing a dry, flowable PVA/plasticizer blend. "Impalpable" refers to a powder which is so fine that the individual particles cannot be distinguished as such by pressing the powder between the thumb and index finger. Impalpable powders include, but are not limited to, powders of magnesium stearate, potassium stearate, sorbitol, fructose, starch, and mixtures thereof. Such powders are known to the art and are commercially available. More preferred for the thermoplastic production of sheets and films is the use of one or more antiblocking agents as the dry, fine powder coating. An antiblocking agent is a substance, e.g., finely divided solids of a mineral nature such as magnesium stearate, potassium stearate and the like, which is added to prevent adhesion of the surfaces of films to each other or to other surfaces. Particularly preferred is an impalpable powder/antiblocking agent, such as magnesium stearate available, for example, from Mallinckrodt, Inc., St. Louis, Missouri. An example of the most preferred impalpable magnesium stearate sold by Mallinckrodt is that sold under the registered trademark HYQUAL. This powder has a particle size distribution such that at least 99.8 percent is smaller than a 325 mesh screen, and has a bulk density of about 7–9 lbs/ft$^3$. A less preferred, though acceptable, fine powder coating/antiblocking agent is a potassium stearate, sold by the Witco Chemical Corporation, New York, New York, and having a particle size distribution of at least 50% through a 100 mesh screen.

A coating-effective quantity of the dry, fine powder coating medium is present in the dry, plasticized PVA blend, and generally will be from about 1.0 to about 10.0 weight percent, preferably from about 1.0 to about 7.0 weight percent, more preferably from about 1.0 to about 5.0 weight percent. The dry, fine powder coating may comprise only one compound, or may comprise mixtures of two or more compounds. The dry, fine powder coating is distributed on the PVA/plasticizer granules by mixing, spraying, or blending, and, as with the plasticizer coating step, must be done in the absence of excessive shear forces or heating. FIG. 1 demonstrates the average range of temperatures encountered during a series of six runs, plotted against time of the plasticizing process. The PVA was blended in a low-intensity mixer, and plasticizer and dry, fine powder coating mixtures were added. The temperature of the resin ranged from 77.9° F. to 82.1° F. initially, and the average was 79.9° F. At the ten minute point, temperatures ranged from 89.1° F. to 99.1° F., averaging 96.4° F. The final temperature of the blend ranged from 89.5° F. to 104.6° F., averaging 96.9° F. In general, the highest temperature during the process should be below about 105° F.

The dry, flowable PVA resin blend produced when PVA resin granules have been coated with plasticizer and the dry, fine powder coating medium will have a distribution of granule sides which provides for passage of at least 90% of the particles through a ¼ inch screen. This specification is satisfied by PVA resin blends having a particle size distribution of at least 90 weight percent less than about 1/4 inch in diameter. Preferably, the PVA resin blend particle size distribution provides a passage of at least 90% through a 1/4 inch screen, at least 85% through a 6 mesh screen, at least 70% through a 16 mesh screen, and at least 50% through a 20 mesh screen. More preferably, the PVA resin will be sized such that at least 95% pass through a ¼ inch screen. PVA resin blends which meet the more preferred specification will have particles in which at least 95 weight percent are less than about ¼ inch in diameter.

It may be desirable to incorporate additional components into the PVA/plasticizer blend. Antioxidants are an especially preferred additive in PVA thermoplastic processing, as they act to protect the PVA chemically during extrusion and melt processes. Antioxidants are generally added to the PVA resin granules in an amount of from about 0.0 to about 2.5%, preferably about 0.1 to about 1.0% by weight.

In a preferred embodiment, one or more antioxidants are mixed with PVA resin granules before coating with plasticizer. The choice of antioxidant, if any, will depend in part upon the ultimate use of the PVA product and of the thermoplastic environment. For example, if the PVA is to be used in a water-soluble film, it is preferable that the antioxidant be water-solubhle. Antioxidants which are appropriate for use with the present invention include but are not limited to citric acid, aspartic acid, phosphoric acid, heavy metals, and a tetrakis (methylene [3, 5-di-tert-butyl-4-hydroxyhydrocinnamate]) methane with the chemical formula of $C_{73}H_{108}O_{12}$, especially that sold under the trademark IRGANOX 1010 by Ciba-Geigy Corp. Other appropriate antioxidants are well known in the art.

Additives which facilitate the processing of the granular PVA/plasticizer blend may also be incorporated, especially lubricants such as stearic acid, waxes, fine-particle silic acid, and heat stabilizers. Additives such as dyes or colors may also be desired to affect characteristics of the product to be formed by thermoplastic processing. If the PVA is to be incorporated into a film which is to be in contact with a perborate-containing compound, such as a bleach, it may be desirable to include a borate scavenger, as described, e.g., in U.S. Pat. No. 4,626,372 issued Kaufmann et al., the disclosure of which is incorporated herein by reference, and/or a pH control agent in the dry powder coating.

Additives desired in the dry, flowable PVA/plasticizer blend may be included during the processing of the blend, and granular additives may be conveniently added to the PVA resin before the plasticizer coating. Liquid materials, and suspensions or solutions of solid materials, may be incorporated into the plasticizer spray. Additives which may be formed into a sufficiently fine or impalpable powder may be added to, or used as, the dry powder coating. Finally, additives may be mixed with the dry PVA/plasticizer blend at any time before or during thermoplastic processing.

The total amount of such additives is preferably less than about 10%, more preferably less than about 5%.

EXPERIMENTAL

PVA resin blends may be formulated to have various compositions, depending in part upon the intended use of the blend. Generally, blends will include PVA resin, one or more plasticizers, and a dry powder coating medium. Colorizing agents, antioxidants, antiblocking agents, pH buffers, etc., may be included in the blend. Variations within the teachings of this invention will be obvious to those skilled in the art. Exemplary of such blends are:

| Ingredient | Formula Weight percent | |
|---|---|---|
| Example 1 | | |
| Polyvinyl Alcohol Resin | 60.0–85.0 | |
| Plasticizer | 10.0–20.0 | |
| Dry coating powder | 1.0–10.0 | |
| Other additives | 0.0–10.0 | |
| Example 2 | | |
| Polyvinyl Alcohol Resin | 69.0–83.0 | |
| Glycerin (96%) | 0.0–15.0 | |
| Water | 1.0–7.0 | |
| Trimethylolpropane | 0.0–14.0 | |
| Borate Scavenger | 0.0–10.0 | |
| Magnesium Stearate | 0.0–2.0 | |
| Potassium Stearate | 0.0–2.0 | |
| Citric Acid | 0.0–0.10 | |
| Antioxidant | 0.0–0.25 | |
| Other additives | 0.0–10.0 | |
| Example 3 | Weight % | Weight % |
| PVA Resin | 74.26[a] | 83.27[b] |
| Borate scavenger | 8.16 | 9.67 |
| Water | 3.00 | 1.95 |
| Glycerin | 6.64 | 2.69 |
| TMP | 6.64 | 1.13 |
| Magnesium Stearate | 1.02 | 1.02 |
| Antioxidant | 0.27 | 0.27 |

[a]PVA Resin as Kuraray 405-S
[b]PVA Resin as Nippon-Gohsei KL-05S

Exemplary of a specific formulation to produce a 2.27 kilogram batch of PVA blend is the following:

| Ingredient | Weight % | Quantity (grams) |
|---|---|---|
| Example 4 | | |
| PVA resin | 72.75 | 1651 |
| Sorbitol | 8.00 | 181.6 |
| Water | 5.00 | 113.5 |
| Glycerin | 6.50 | 147.6 |

-continued

| Ingredient | Weight % | Quantity (grams) |
|---|---|---|
| TMP | 6.50 | 147.6 |
| Magnesium Stearate | 1.00 | 22.7 |
| Antioxidant | 0.25 | 5.7 |

Particle size, which is critical to the success of the process, is conveniently measured by "screening" the PVA resin. A series of progressively finer screens are weighed to determine tare weights. PVA resin is then passed through the series of screens. PVA granules which do not pass a given screen mesh are weighed, together with the screen, and the tare weight is subtracted, to give the amount of PVA resin which remains on the screen. PVA resin which passes a screen is then screened by the next in the series. A particle size distribution for a given PVA resin source or batch may thus be determined. Alternatively, methods other than screening may be currently available and may find use to determine particle size. For example, a GRANU-LOMETRE (a trademarked product of Micro Scientific) utilizes a laser to determine particle size ranges. Tables 1 and 2 show particle size distributions for various commercially available resins, both as supplied and after conditioning. Note that Samples C and D of Table 1 do not possess the requisite particle size distribution of the present invention.

TABLE 1

| | Particle Size Distribution of Uncoated PVA Resins as Measured by Screening (Weight percent) | | | | | |
|---|---|---|---|---|---|---|
| Screen | Sample | | | | | |
| Size | A | B | C | D | E | F |
| 5 | 0 | — | 0 | 0 | — | — |
| 6 | 0 | 0 | — | 0 | — | — |
| 8 | — | 0.4 | — | — | — | — |
| 20 | 0.1 | — | 76.9 | 15.2 | 0 | 0.05 |
| 30 | 0 | — | 15.6 | 13.3 | 0 | 0.05 |
| 35 | 0.2 | 0 | — | — | 0.1 | 0.2 |
| 40 | — | — | 5.1 | — | — | — |
| 50 | — | — | 0.9 | — | — | — |
| 60 | 0.1 | 0.2 | — | 40.0 | 21.2 | 15.2 |
| 80 | — | 24.1 | — | — | — | — |
| 100 | 12.2 | 4.7 | — | 15.4 | 44.8 | 41.4 |
| 170 | — | 23.0 | — | — | — | — |
| 200 | 60.3 | 3.6 | — | — | 26.0 | 35.3 |
| Tray | 27.3 | 34.4 | 0.9 | 16.0 | 7.8 | 7.7 |
| Total[1] | 100.2 | 100 | 99.8 | 99.9 | 99.9 | 99.9 |

A = GELVATOL 3000 (Monsanto)
B = GELVATOL 3000 (Monsanto)
C = M4-88 (Hoechst)
D = VINOL V205 (Air Products)
E = Pulverized VINOL V205 (Air Products) using a Mikro-Pulverizer, type SH (a trademark of Mikropul, a division of the Slick Corporation)
F = Twice Pulverized VINOL V205 (Air Products) using a Mikro-Pulverizer, type SH
[1] Total may not equal 100% due to rounding.

TABLE 2

| | Particle Size Distribution of Uncoated PVA Resins as Measured by Granulometer (Weight percent) | | | | |
|---|---|---|---|---|---|
| Particle Size | Screen | Kuraray 405-S | | Nippon-Gohsei KL-05S | |
| (Microns) | Size | Trial #1 | Trial #2 | Trial #1 | Trial #2 |
| 1 | * | 0.4% | 0.7% | 0.2% | 0.2% |
| 1.0–1.5 | * | 0.2% | 0.2% | 0.2% | 0.1% |
| 1.5–2 | * | 0.8% | 0.5% | 1.0% | 1.5% |
| 2–3 | * | 0.9% | 0.1% | 1.2% | 0.8% |
| 3–4 | * | 0.6% | 0.0% | 1.1% | 1.1% |
| 4–6 | * | 0.6% | 0.0% | 1.1% | 1.1% |
| 6–8 | * | 0.5% | 0.2% | 0.5% | 0.7% |
| 8–12 | * | 0.6% | 0.0% | 0.2% | 0.3% |
| 12–16 | * | 2.2% | 0.3% | 2.1% | 2.7% |
| 16–24 | * | 4.4% | 0.3% | 5.4% | 5.6% |
| 24–32 | * | 5.9% | 2.3% | 8.5% | 7.6% |
| 32–48 | 325 | 12.8% | 6.9% | 20.8% | 20.9% |
| 48–64 | 250 | 7.1 | 8.1% | 10.3% | 9.7% |
| 64–96 | 150–250 | 23.74% | 35.4% | 25.4% | 26.3% |
| 96–128 | 120–150 | 29.4% | 33.7% | 16.4% | 15.9% |
| 128–192 | 60–120 | 9.9% | 11.3% | 5.6% | 5.3% |
| Total[1] | | 100.0 | 100.0 | 100.0 | 99.8 |
| Median, in microns | | 81.5 | 91.4 | 59.8 | 60.1 |

* = screen size smaller than 325 mesh
[1] Total may not equal 100% due to rounding.

EXAMPLE A

A clean, dry medium-intensity mixer was charged with PVA resin and antioxidant (IRGANOX 1010) in the proportions given in Example 4. The PVA resin was GELVATOL 3000 having the particle size distribution of Sample A of Table 1. One-half of the sorbitol was added, and the mixer was run for 30 seconds prior to addition of plasticizer. The liquid plasticizer mixture of TMP, water, and glycerin was sprayed onto the dry ingredients at a rate of 200–300 grams per minute, and the mixture was blended for 1 minute following the complete addition of the plasticizer. Mixing continued for 1 minute after the magnesium stearate and the remainder of the sorbitol were added, and the blend was discharged.

The maximum temperature of the blend during mixing, as measured by a probe within the mixer, was 80° F., and the maximum blend temperature immediately after discharge was 105° F. After discharge of the blend, the mixer appeared clean with only trace amounts of resin and plasticizer on the mixing plows and walls of the mixer. The blend was free-flowing upon discharge, and remained free-flowing after storage in a sealed bag. The particle size distribution of the PVA/plasticizer blend was such that at least 90% of the granules passed a ¼ inch screen, at least 85% passed a 6 mesh screen, at least 70% passed a 16 mesh screen, and at least 50% passed a 20 mesh screen.

EXAMPLE B

The PVA resin of this Example was mechanically conditioned to meet the particle size distribution requirement.

A clean, dry medium-intensity mixer was started and charged with pulverized V205 PVA from Air products, IRGANOX 1010, and TMP in the proportions given in Example 4. The pulverized V205 PVA had the particle size distribution as shown by Sample E of Table 1. The mixer was run for 30 seconds, and then glycerin and water were sprayed in at a uniform rate over 75 seconds. A mixture of sorbitol and magnesium stearate was then added, the mixer was run an additional 30 seconds, and the blend was discharged. No temperature increase was noted: the temperature remained near ambient. The mixer appeared clean except for some residue on the plows and walls. The blend was dry and flowable, and did not cake. The particle size distribution of the resulting PVA/plasticizer blend was such that at least 95% of the granules passed a ¼ inch screen, at least 90% passed a 6 mesh screen, at least 75% passed a 16 mesh screen, and at least 50% passed a 20 mesh screen.

EXAMPLE C

Example C demonstrates the effect of a poor liquid plasticizer coating on an otherwise appropriately-sized PVa resin.

The procedure of Example A was followed, but all the sorbitol was added to the liquid mixture. This caused the liquid mixture to be extremely viscous, and a good spray pattern was not formed. The resulting blend was wet and sticky. Upon drying, the blend took the shape of the container, and was difficult to break apart. The addition of the sorbitol to the spray mixture resulted in a more viscous solution, causing a poor spray pattern. As a result, plasticization was incomplete, the resultant PVA/plasticizer resin blend was not dry or free-flowing, and a particle size distribution of the coated PVA/plasticizer blend was unobtainable.

EXAMPLE D

Example D demonstrates the failure to provide a suitable dry powder coating. Here, the dry powder coating agents were added to the PVA resin before plasticization.

The procedure of Example A was followed, but all the sorbitol and the magnesium stearate were initially added to the PVA and antioxidant instead of being used as a dry powder coating. The result was a wet, sticky blend which took the shape of the container upon drying and was very difficult to break apart. No particle size distribution was obtained for the resulting PVA/plasticizer blend. The use of a dry coating powder as a coating layer after plasticization is important to the production of a free-flowing PVA/plasticizer resin blend.

EXAMPLE E

Example E demonstrates the use of a PVA resin having an inappropriate particle size distribution, leading to incomplete plasticization resulting in a PVA/plasticizer resin blend which is not free-flowing.

A clean, dry medium-intensity mixer was started and charged with M4-88 PVA from Hoechst, IRGANOX 1010, and TMP in the proportions given in Example 4. The M4-88 PVA had the particle distribution as shown by Sample C of Table 1. The mixer was run for 30 seconds, then a total of 259.4 grams of glycerin and water were sprayed in at a uniform rate over 75 seconds. A mixture of sorbitol and magnesium stearate was added, the blender was run for 30 seconds, and the blend discharged. No temperature increase was noted. The mixer was extremely messy, with wet beads of resin coating the entire mixer. The blend was very dense and wet, and caked severely. No particle size distribution was obtained due to the caking.

EXAMPLE F

Example F demonstrates the inability to obtain a useful product due to high intensity mixing resulting in a blend temperature of above about 105° F. Runs were carried out with both Nippon Gohsei GL-05, and Kuraray 405-S resins, each having a particle size distribution satisfying the minimum requirements of the present invention. The formulations used to produce the blends were as defined in Example 1. A clean, dry high-intensity mixer, of the type used in the art for plastic processing, was filled with the dry ingredients. The mixer was started at low speed, then run to high speed as liquid plasticizer was sprayed in. Mixing continued until the blend reached a temperature of about 212 to 220° F., then mixing was stopped and the blender cooled. The mixer was emptied when the blend temperature dropped to about 150° F. The GL-05 resin batch yielded a very clumped blend, having a number of "plastic" lumps which were difficult to break apart. The 405-S batch mixed well, however the walls of the mixer were gummed up with the blend and were difficult to scrape down. Blend particle size distributions were not obtained.

Although the above description and the claims which are appended hereto describe methods and compositions which are useful for providing a PVA/plasticizer blend suitable for thermoplastic processing, in fact, variations and modifications thereof will be obvious to those skilled in the art, and obvious equivalents and alternative embodiments consistent with the scope and content of this application are included herein.

We claim:

1. A process for the production of a dry, flowable polyvinyl alcohol (PVA) resin blend capable of thermoplastic processing comprising the steps of:
   (a) selecting a PVA resin having a particle size distribution such that at least 80% of the resin consists of particles having a diameter less than about 500 microns;
   (b) coating the PVA resin with a liquid plasticizer medium in an amount sufficient to plasticize the PVA resin, to produce PVA/plasticizer granules; and
   (c) mixing the PVA/plasticizer granules with a dry powder coating medium to produce a dry, fine plasticized PVA blend;
   wherein the coating and mixing steps are conducted at a temperature of less than about 105° F., and wherein the dry, plasticized PVA blend has a particle size distribution such that at least about 90% of the blend passes through a ¼ inch mesh screen.

2. A process according to claim 1 wherein at least 95% of the PVA resin particles have a diameter less than about 500 microns.

3. A process according to claim 1 wherein the PVA comprises from about 60 to about 85 weight percent of the dry, plasticized PVA blend.

4. A process according to claim 1 wherein the liquid plasticizer medium is selected from the group consisting of water, glycerin, trimethylolpropane, neopentyl glycol, polyethylene glycol, and mixtures thereof.

5. A process according to claim 1 wherein the liquid plasticizer medium comprises from about 10 to about 20 percent by weight of the PVA/plasticizer blend.

6. A process according to claim 1 wherein the dry, fine powder coating medium comprises from about 1.0 to about 10.0 weight percent of the dry plasticized PVA blend.

7. A process according to claim 6 wherein the dry, fine powder coating medium is selected from the group consisting of magnesium stearate, potassium stearate, sorbitol, fructose, starch, and mixtures thereof.

8. A process according to claim 1 wherein the dry, fine powder coating medium is an impalpable powder.

9. A process according to claim 1 and further including from about 0 to 10 weight percent of an additive, selected from the group consisting of antioxidants, antiblocking agents, borate scavengers, and mixtures thereof.

10. A process according to claim 1 wherein the liquid plasticizer is spray coated onto the PVA resin.

11. A process according to claim 1 wherein at least 90% of the dry, plasticized PVA blend comprises granules having a diameter of less than about ¼ inch.

12. In a process for producing a dry, flowable PVA resin blend capable of thermoplastic processing of the type wherein a quantity of PVA resin particles are admixed with a plasticizer, the improvement comprising
   (a) selecting a quantity of PVA resin having a resin particle size distribution such that at least about 80% of the resin consists of particles having a diameter of about 500 microns or less;
   (b) coating the particles with a plasticizingeffective amount of a liquid plasticizer medium to produce a quantity of PVA/plasticizer granules; and
   (c) mixing the PVA/plasticizer granules with a coating-effective amount of a dry, fine powder coating medium to produce a dry, flowable, plasticized PVA blend having a distribution of PVA particle sizes such that at least 90% passes through a ¼ inch screen; and wherein the coating and mixing steps are conducted at a temperature of less than about 105° F.

13. The process according to claim 12 wherein the PVA resin comprises from about 60 to about 85 percent by weight of the dry, plasticized PVA blend.

14. The process according to claim 12 wherein the plasticizer is selected from the group consisting of water, glycerin, trimethylolpropane, neopentyl glycol, polyethylene glycol, and mixtures thereof.

15. The process according to claim 12 wherein the plasticizer comprises from about 10 to about 20 percent by weight percent of the dry, plasticized PVA blend.

16. The process according to claim 12 wherein the dry, fine coating medium comprises from about 1.0 to about 10.0 weight percent of the dry, plasticized PVA blend.

17. The process according to claim 12 wherein the dry, fine coating medium is selected from the group consisting of magnesium stearate, potassium stearate, sorbitol, fructose, starch, and mixtures thereof.

18. The process according to claim 17 wherein the dry, fine coating medium is an impalpable powder.

19. The process according to claim 12 further comprising from about 0 to about 10 weight percent of an additive selected from the group consisting of antioxidants, antiblocking agents, borate scavengers, and mixtures thereof.

20. The process according to claim 12 wherein the liquid plasticizer medium is spray-coated onto the PVA resin.

21. The process according to claim 12 wherein at least 90% of the dry, plasticized PVA blend comprises granules having a diameter of less than about ¼ inch.

* * * * *